United States Patent
Cline et al.

(10) Patent No.: US 10,002,222 B2
(45) Date of Patent: Jun. 19, 2018

(54) SYSTEM AND METHOD FOR PERFORATING REDUNDANT METAL IN SELF-ALIGNED MULTIPLE PATTERNING

(71) Applicant: ARM Limited, Cambridge (GB)

(72) Inventors: Brian Tracy Cline, Austin, TX (US); Gregory Munson Yeric, Austin, TX (US)

(73) Assignee: ARM Limited, Cambridge (GB)

( * ) Notice: Subject to any disclaimer, the term of this patent is extended or adjusted under 35 U.S.C. 154(b) by 7 days.

(21) Appl. No.: 15/210,109

(22) Filed: Jul. 14, 2016

(65) Prior Publication Data

US 2018/0018420 A1    Jan. 18, 2018

(51) Int. Cl.
| | |
|---|---|
| *G06F 17/50* | (2006.01) |
| *G06F 19/00* | (2018.01) |
| *G21K 5/00* | (2006.01) |
| *G03F 1/00* | (2012.01) |
| *H01L 23/528* | (2006.01) |
| *H01L 21/768* | (2006.01) |

(52) U.S. Cl.
CPC ...... *G06F 17/5072* (2013.01); *G06F 17/5045* (2013.01); *G06F 17/5081* (2013.01); *H01L 21/76892* (2013.01); *H01L 23/528* (2013.01); *G03F 1/00* (2013.01); *G06F 19/00* (2013.01); *G06F 2217/12* (2013.01); *G21K 5/00* (2013.01)

(58) Field of Classification Search
CPC ............ G06F 17/5072; G06F 17/5045; G06F 17/5081; G06F 2217/12; G06F 19/00; G21K 5/00; G03F 1/00
USPC ........... 716/54, 55, 51; 430/4, 5; 378/34, 35; 700/98, 117, 120, 121
See application file for complete search history.

(56) References Cited

U.S. PATENT DOCUMENTS

| | | | | |
|---|---|---|---|---|
| 6,532,581 B1 * | 3/2003 | Toyonaga | ........... | G06F 17/5068 257/786 |
| 7,047,514 B2 * | 5/2006 | Mizuno | ................. | H01L 27/118 257/E27.105 |
| 9,330,221 B2 * | 5/2016 | Yuan | .................... | G06F 17/5077 |
| 9,735,029 B1 * | 8/2017 | Chu | .................. | H01L 21/31144 |

(Continued)

OTHER PUBLICATIONS

Dai et al., Chinese Patent Application, Publication No. CN 102446827 A, published May 9, 2012, English abstract and a drawing only, 3 pages.*

*Primary Examiner* — Phallaka Kik
(74) *Attorney, Agent, or Firm* — Pramudji Law Group PLLC; Ari Pramudji

(57) ABSTRACT

A method for modifying metal portions of a layout data file associated with a self-aligned multiple patterning (SAMP) process. The method comprises receiving the layout data file that includes one or more active metal portions and layout information associated with an integrated circuit. The method also comprises converting the layout data file to further include mask information having at least a first set of trim features associated with one or more redundant metal portions and one or more active metal portions of the layout data file. The method also comprises determining the one or more redundant metal portions to be perforated. The method further comprises modifying the mask information to further include a second set of trim features for perforating the one or more redundant metal portions. The first set of trim features and the second set of trim features are associated with a trim mask of the SAMP process.

20 Claims, 7 Drawing Sheets

(56) References Cited

U.S. PATENT DOCUMENTS

| | | | |
|---|---|---|---|
| 2005/0089770 A1* | 4/2005 | Liu | G03F 1/34 |
| | | | 430/5 |
| 2008/0203562 A1* | 8/2008 | Araki | H01L 23/5286 |
| | | | 257/734 |
| 2008/0290530 A1* | 11/2008 | Yun | G03F 9/7076 |
| | | | 257/797 |
| 2009/0092926 A1* | 4/2009 | Gutmann | G03F 1/26 |
| | | | 430/312 |
| 2014/0259658 A1* | 9/2014 | Hsu | H05K 3/0082 |
| | | | 29/847 |
| 2014/0291858 A1* | 10/2014 | Bouton | H01L 21/0337 |
| | | | 257/774 |
| 2015/0339428 A1* | 11/2015 | Yuan | G06F 17/5081 |
| | | | 716/52 |
| 2017/0024506 A1* | 1/2017 | Kuo | G06F 17/5072 |

* cited by examiner active metal      redundant metal

SYSTEM AND METHOD FOR PERFORATING REDUNDANT METAL IN SELF-ALIGNED MULTIPLE PATTERNING

TECHNICAL FIELD

The present technique(s) relate to a system and method for perforating redundant metal associated with a Self-Aligned Multiple Patterning (SAMP) process.

BACKGROUND

The desire for making ever smaller integrated circuits (IC's) has brought about the development and use of different lithographic approaches to accurately generate the IC components at nanometer scales. A particular approach used for semiconductor manufacturing is what is referred to as self-aligned multiple patterning (SAMP).

SAMP, while using nanometer wavelength lithography (e.g., 193 nm), is a primary lithography candidate for the generation of metal wire/interconnect layers associated with small (e.g., 10 nm, 7 nm and below) semiconductor manufacturing roadmaps. A particular implementation of SAMP used for the printing/generation of metal routing layers, is an implementation referred to as the "sidewall-is-dielectric" (SID) implementation.

This implementation of SAMP involves the printing of a set of lines utilizing what is referred to as a "mandrel" mask. The set of lines are lithographically printed at a relaxed pitch that will reliably print and yield in nanometer lithography (e.g., Deep Ultraviolet (DUV) lithography). Material is then grown onto the sidewall of those lines and the original relaxed-pitch "mandrel" lines are then removed, leaving only the sidewall lines. This, in effect, doubles the number of lines compared to the original pattern, and is often referred to as "self-aligned double patterning" (SADP).

Implementations of SAMP may also utilize a "trim" mask that is used to determine the metal patterns to be filled with metal during a metal fill process associated with the SAMP (e.g., a metal fill step and/or chemical mechanical polishing/planarization [CMP]). For example, the trim mask may be used for the creation of line ends for the metal pattern (i.e., areas where no metal is laid, indicating ends of metal lines).

Different approaches for the trim mask are available in SAMP. One approach is referred to as a "line-staggered" SAMP approach in which the trim mask has a trim pattern that correspond to areas of an etched inter-layer dielectric (ILD) that are not to be filled with metal (e.g., a metal layer of a technology process). The trim pattern of the trim mask for the line-staggered approach may be complex in that the trim pattern may have large or numerous shapes and/or may include multiple "turns" or corners within the pattern. Such complexity of the trim mask may facilitate "rounding" or misalignment errors which may result in yield issues for the trim mask and may translate to yield issues in the trimmed metal wires/fill.

A preferred approach is referred to as a "line-cut" SAMP approach in which the trim mask has a trim pattern that corresponds to areas of an etched ILD that are filled with metal that is either "active" metal or "redundant" metal (i.e., "dummy" metal). The trim pattern of the trim mask for the line-cut approach may be less complex in that the trim pattern may have simpler shapes with an avoidance of "turns" or corners within the trim pattern. Such reduced complexity may result in higher yielding trim masks for the line-cut approach, which may translate to reduced costs in manufacturing and for the end consumer.

A known tradeoff of this reduced complexity associated with the line-cut SAMP approach is a resulting parasitic capacitance penalty. For example, the additional metal lines, in the form of redundant metal, associated with the line-cut SAMP approach may result in increased parasitic capacitance between active metal lines and neighboring redundant metal lines. This increased parasitic capacitance may significantly reduce a circuit design's maximum achieved frequency. Additionally, the increased parasitic capacitance may in some cases result in as much as a 10% to 15% performance loss for circuit designs.

Furthermore, the line-cut SAMP approach may also be susceptible to the lithography limitations that are associated with other SAMP techniques. Limitations such as merging effects (e.g., in which shapes of a trim mask merge to form an erroneous trim pattern) or various misalignments associated with the trim mask may be encountered with the line-cut SAMP approach. The above described problems associated with SAMP implementations may result in reduced mask yields, increased cost, and diminished performance for IC designs in small (e.g., 10 nm, 7 nm and below) process technologies. A need exists to reduce or eliminate the above described problems associated with SAMP implementations.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, or systems described herein.

DETAILED DESCRIPTION

Figure 1A:
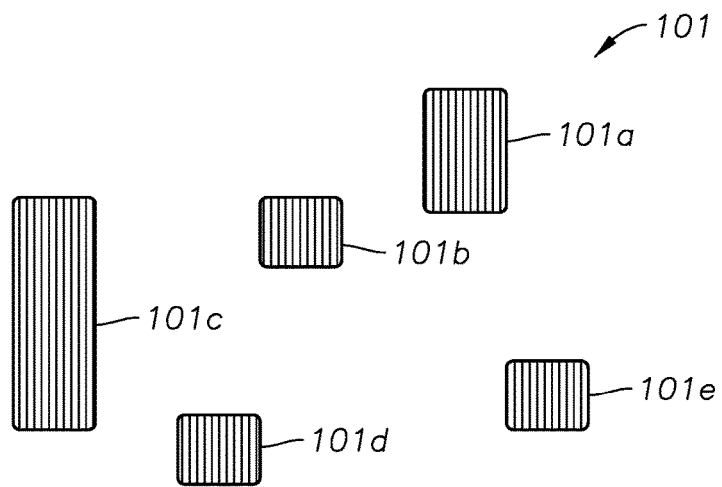
FIG. 1A illustrates exemplary trim mask information associated with a method in accordance with one embodiment.

Before discussing the embodiments with reference to the accompanying figures, a brief description of various embodiments is provided.

In one embodiment, a method for modifying metal portions of a layout data file associated with a self-aligned multiple patterning (SAMP) process is described herein. The method includes receiving the layout data file that includes one or more active metal portions and layout information associated with an integrated circuit (IC) of a process technology. The method also includes converting the layout data file to further include mask information having at least a first set of trim features associated with one or more redundant metal portions and the one or more active metal portions of the layout data file. The method also includes determining the one or more redundant metal portions to be perforated. The method further includes modifying the mask information to further include a second set of trim features for perforating the one or more redundant metal portions. The first set of trim features and the second set of trim features are associated with a trim mask of the SAMP process.

In another embodiment, there is provided a system for modifying metal portions of a layout data file associated with a self-aligned multiple patterning (SAMP) process as described herein. The system includes means for receiving the layout data file that includes one or more active metal portions and layout information associated with an integrated circuit (IC) of a process technology. The system also includes means for converting the layout data file to further include mask information having at least a first set of trim features associated with one or more redundant metal portions and the one or more active metal portions of the layout data file. The system also includes means for determining the one or more redundant metal portions to be perforated. The system further includes means for modifying the mask information to further include a second set of trim features for perforating the one or more redundant metal portions. The first set of trim features and the second set of trim features are associated with a trim mask of the SAMP process.

In another embodiment, there is provided a computer program product on a non-transitory storage medium for controlling a computer to perform a method of modifying metal portions of a layout data file associated with a SAMP process as described herein.

In another embodiment, there is provided a method of manufacturing an integrated circuit. The method of manufacturing includes employing the method(s) described herein to modify metal portions associated with a self-aligned multiple patterning (SAMP) process. The method of manufacturing also includes generating a layout data file incorporating modified mask information associated with the modified metal portions. The method of manufacturing further includes manufacturing the integrated circuit from the layout data file.

Various implementations described herein are directed to modifying metal portions of a layout data file associated with a SAMP process so as to address mask yield and performance limitations (e.g., minimizing parasitic coupling capacitances, reduction in misalignment and merging errors) associated with a line-cut SAMP approach for the manufacturing of an IC layout design. Such implementations may be automated to enable efficient modification of mask information, the corresponding metal portions, and the associated layout data file of an IC design (e.g., layout data of individual component circuits, larger device circuits, and/or whole system on a chip (SoC)).

The various implementations may be process independent such that it may be applied to various process technologies. For example, such implementations may be applied to process technologies having small process geometries with dimensions or pitches that could employ multiple patterning techniques to generate the final wafer geometries. Such implementations may also be applied to process technologies for manufacturing various devices, such as planar devices, multi-gate devices (e.g., FinFET devices), or other, more exotic, devices that are currently being explored (e.g., nanowire devices or III-V devices), or any combination thereof.

The line-cut SAMP approach utilizes a trim mask having a trim pattern that is comprised of different trim "features" (e.g., also referred to as mask "trims" of a trim mask). The trim features determine line ends of the metal lines to be made on a physical layer such as an inter-layer dielectric (ILD) layer. The trim features also define in part the formation of the metals lines that are comprised of both active metal and redundant metal. Active metal may be those metal lines that are physically or electrically connected to the circuit design (e.g., forms or labeled as a "net" or "node" in a circuit design netlist, or connected to a power source such as ground, VSS, or VDD). Redundant metal (i.e., dummy metal) may be those metal lines that are not physically or electrically connected to the circuit design (e.g., "floating" metal lines). In a particular embodiment, redundant metal may also include metal lines that are physically electrically connected to the circuit design (i.e., has "active" metal characteristics) but which are superfluous to the circuit design. In such a case, the methods described herein may utilize redundant metal to form line extensions for trim feature optimization purposes.

The use of the line-cut SAMP approach for metal interconnect patterning and the generation of metal wire/interconnect layers associated with small process geometries may have limitations. For example, in the cases where the redundant metal is "floating," this resulting redundant metal, though unconnected, enables the formation of parasitic capacitances that couple between the active metal and neighboring redundant metal. For small process geometries, such parasitic capacitances may have a significant deleterious impact on the timing of signals through active metal lines and/or corresponding maximum frequency ranges achievable for the signals of the IC design.

The methods described herein for modifying metal portions of a layout data file associated with a SAMP process, which includes the modification of mask information associated with the metal portions, may enable smaller and more distributed capacitances associated with the redundant metal and active metal lines. For example, metal portions (e.g., one or more portions of redundant metal lines and/or one or more portions of active metal lines) may be modified by modifying mask information of the layout data file. The modified mask information may include trim features (e.g., information representing trim "shapes", mask "trims") such as a first set of trim features and a second set of trim features. The second set of trim features may correspond to and/or may be used to generate perforations of one or more redundant metal portions (e.g., portions of redundant metal lines are perforated), where the redundant metal portions are defined in part by the first set of trim features. The second set of trim features and their resulting perforations may enable the formation of redundant metal sub-portions that are distributed along neighboring active metal lines. The redundant metal sub-portions may have a size that is smaller than a size of a corresponding redundant metal portion of the one or more redundant metal portions. In this manner, metal portions (e.g., redundant metal portions) may be modified (e.g., perforated) to have corresponding smaller coupling capacitances with neighboring active metal portions. Such modifications enable the reduction of parasitic capacitances associated with metal lines formed with a line-cut SAMP approach and enable corresponding improvements in signal timing and achievable maximum frequency for the IC design.

The line-cut SAMP approach may also be susceptible to other lithography limitations that are associated with multiple patterning techniques. For example, when trim features of mask information are located too close together, the resulting trim mask may have trim features that have merged together. Such merging effects result in portions of a corresponding trim pattern and resulting metal lines (e.g., active or redundant metal lines) that are erroneous. As another example, trim features of a trim mask may be susceptible to lithographic variability (e.g., dose and defocus variation), edge placement error (EPE), and can also misalign with respect to the associated metal line mask(s). Such variability, misalignment, and EPE may result in unintended metal shapes (e.g., such as shapes referred to as "spurs") with excessive metal that can short metal lines or further add capacitance associated with the metal lines.

The methods described herein for the modification of mask information associated with the metal portions of a layout data file associated with a SAMP process may provide modified mask information having a second set of trim features (e.g., perforation features) that are aligned with initial trim features (e.g., a first set of trim features) or that are aligned with initial or existing metal line ends (e.g., lateral edges of the end of a metal line). Such modifications may reduce the variability and EPE of the associated trim features of the trim mask and reduce the probability of misalignment with the related metal line mask(s), resulting in improved mask yield for trim masks of the SAMP process. In a particular embodiment, the methods may also include choosing a set of trim features for the modifications based on a comparison of potential trim mask yield due to use of a proposed set of trim features versus the potential reduction in parasitic coupling capacitance achieved due to use of the proposed set of trim features. Additionally, in cases where a desired trim pattern may result in merged features (e.g., desired pattern has features located too close to each other), the use of a second set of trim features may provide features whose locations avoid merging while providing the results of the desired trim pattern.

In a non-limiting example, the methods described herein for the modification of the metal portions of a layout data file associated with a SAMP process may provide modified mask information having a third set of trim features that are oriented orthogonal to a first set and/or to a second set of trim features included in the modified mask information. The first set and a second set of trim features may be associated with a first trim mask, and the third set of trim features may be associated with a second trim mask. The line-cut SAMP process that utilizes a modified layout data that includes first, second, and third trim features may provide first and second trim masks that prevent the generation of whole segments of redundant metal portions in addition to perforating other redundant metal portions. In this manner, further reductions in parasitic coupling capacitances may be achieved for metal lines (e.g., active and redundant metal) formed with a line-cut SAMP approach.

In another embodiment, the modified mask information provided by the methods described herein may be associated with various etching processes such as, but not limited to, a "selective etch" process. For example, the modified mask information may include a first set of trim features associated with a first trim mask that may be selective to a first set of metal line patterns and unselective to other sets of metal line patterns. Similarly, other sets of trim features associated with other trim masks may be selective/unselective to other sets of metal line patterns. In this way, particular metal line patterns may be selected for etching purposes utilizing the modified mask information. The "selective etch" process may be based on the selection of particular materials associated with different sets of metal line patterns and/or different sets of trim features. In a further embodiment, use of the "selective etch" process with the methods described herein may enable the merging of neighboring trim features across unselected sets as part of the perforation of one or more redundant metal portions. The methods above and further described herein, may incorporate a "selective etch" process to enable further efficiencies in the perforation of redundant metal portions and/or for the enhanced alignment of trim features for improved mask yield.

By the methods above and further described herein, it will be understood that the modification of information (e.g., metal portions, layout information, mask information, etc.) of the layout data file associated with a SAMP process is, in one embodiment, directed to the line-cut SAMP approach/ process. The methods above and further described herein may also be directed toward other SAMP approaches/processes. Furthermore, the methods above and further described herein may also be directed toward various types of nanometer lithography such as, but not limited to, Deep Ultraviolet (DUV) lithography, Extreme Ultraviolet (EUV) lithography, Directed Self-Assembly lithography, Electron Beam (E-beam) lithography, or Nano-imprint lithography. Additionally, as further described herein, it will be understood that an automated mechanism for modifying metal portions of a layout associated with a SAMP process may enable the efficient reduction of parasitic capacitances associated with metal lines formed with a line-cut SAMP approach and enable corresponding improvements in signal timing and achievable maximum frequency for the IC design. Furthermore, the techniques described herein may reduce the variability, EPE, and probability of misalignment associated with trim features of the trim mask or the improvement of mask yield for trim masks of the SAMP process. Accordingly, the iterative and automated application of the methods described herein may improve the productivity and reduce the time required to make modifications to mask information, the corresponding metal portions, and the associated layout data file of an IC design. This in turn may allow for additional iterations for improvements of the overall quality of the design at less cost.

Referring now to FIG. 1A, exemplary trim mask information associated with a method in accordance with one embodiment is shown and generally designated 101. The mask information 101 may be included in a layout data file that is associated with a SAMP process (e.g., a line-cut SAMP approach). The layout data file may include layout information associated with an integrated circuit design of a process technology. The layout information may further include circuit information, polygon information, layout rule information, process layer information, process rule information, mask rule information, and other circuit fabrication information. In a particular embodiment, the layout information may further include other mask information, information corresponding to one or more active metal portions, or a combination of both. In one embodiment, the mask information 101 may be part of a separate data file that is based on the layout data file.

The mask information 101 may include one or more trim features 101a-101e (e.g., the polygons illustrated in vertical stripes) that collectively form a trim pattern. The trim features 101a-101e may also collectively represent a first set of trim features that are associated with a trim mask (e.g., a first trim mask) that is generated based on the mask information 101. The area of each of the trim features 101a-101e may correspond to areas of an inter-layer dielectric (ILD) layer that are absent of metal after a metal fill process. For example, the trim features 101a-101e, as part of the mask information 101, may be used to form a corresponding trim mask having shapes substantially similar to the trim features 101a-101e. The corresponding trim mask, as part of a line-cut SAMP process and/or fabrication process, may be used to determine the metal patterns to be filled with metal during a metal fill process. Accordingly, the trim features 101a-101e may define in part the metal lines (e.g., active metal and redundant metal) and their associated line "ends."

Figure 1B:
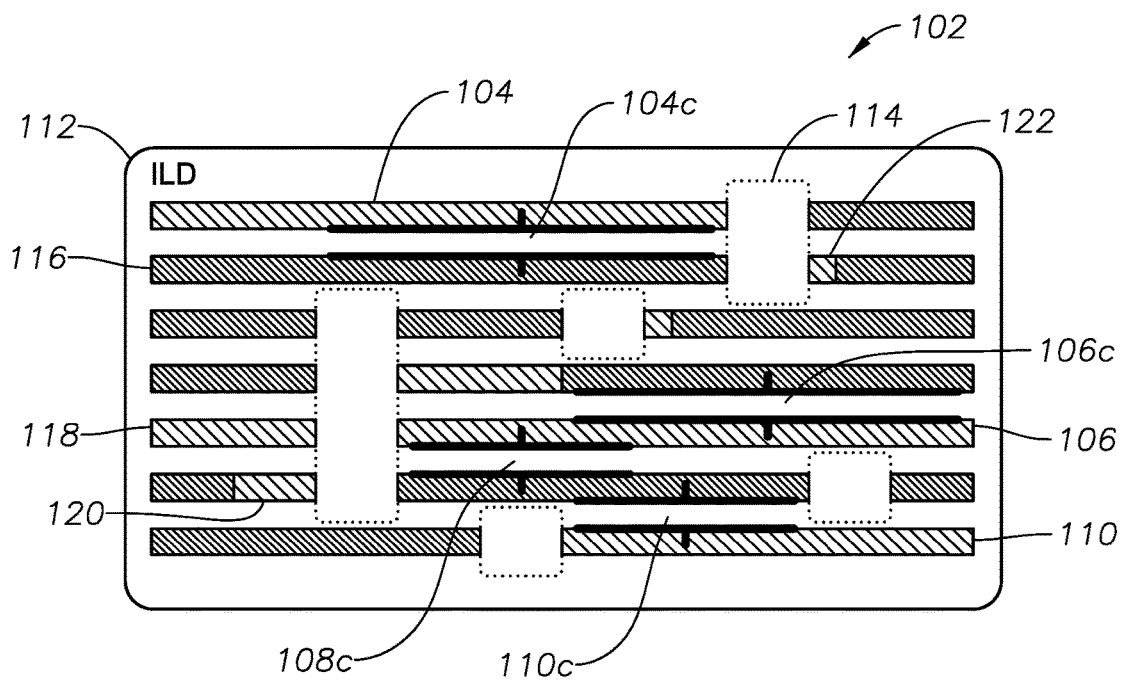
FIG. 1B is a diagram that illustrates an exemplary process layer with portions of metal lines generated in the layer using a SAMP process that is associated with a method in accordance with one embodiment.

Referring to FIG. 1B, an exemplary process layer with portions of metal lines generated in the layer using a SAMP process that is associated with a method in accordance with one embodiment is shown and generally designated 102. The process layer 102 may be based on the mask information 101 of FIG. 1A and its associated layout data file. For example, the layout data file, having the mask information 101 (as well as other information), may be utilized as part of the SAMP process (e.g., a line-cut SAMP approach) to generate metal line portions, such as active metal portions and redundant metal portions, within the process layer 102. Accordingly, the metal line portions (and their associated characteristics: dimensions, electrical parameters, capacitances, layer and/or circuit information, etc.) of the process layer 102 may have corresponding data representations that are part of the layout information and/or mask information 101 of FIG. 1A.

The process layer 102 may be an inter-layer dielectric (ILD) 112 of a process technology. The process layer 102 may include various portions of metal lines that may be within the ILD 112. For example, the process layer 102 may include one or more active metal portions (e.g., as indicated by the dark compressed diagonal-stripe pattern) as exemplified by, but not limited to, the active metal portion 116. The process layer 102 may also include one or more redundant metal portions (e.g., as indicated by the light uncompressed diagonal-stripe pattern) as exemplified by, but not limited to, the redundant metal portions 104, 106, 110, 118, and 120. Active metal portions may be physically or electrically connected to the circuit design (e.g., forms or labeled as a "net" or "node" in a circuit design netlist, or connected to a power source such as ground, VSS, or VDD). Redundant metal (i.e., dummy metal) may be those metal lines that are not physically or electrically connected to the circuit design (e.g., "floating" metal lines). In a particular embodiment, the redundant metal portions may also be metal extensions (e.g., the redundant metal extension 122) connected to active metal portions and may be superfluous to the circuit design.

The active metal portions and the redundant metal portions may be based on the mask information 101 of FIG. 1A and its associated layout data file. For example, certain areas on the process layer 102 that do not have metal portions (e.g., as depicted by the dotted outlined areas) may correspond to the trim features 101a-101e of the mask information 101 of FIG. 1A. To illustrate, the dotted outlined area 114 may correspond to the trim feature 101a of FIG. 1A. Trim features 101b-101e of the mask information 101 of FIG. 1A may similarly correspond the other dotted outlined areas depicted in FIG. 1B. It is to be understood that the dotted outlined areas of FIG. 1B indicate un-metalized areas that are the result of trim features of the mask information 101.

In this manner, the patterning of metal portions and their associated line ends are defined in part by the information (e.g., the trim features, mask information, layout information, etc.) of the layout data file. Such patterning may result in coupling capacitances between neighboring metal portions. In a non-limiting example, a coupling capacitance 104c may occur between an active metal portion 116 and a neighboring redundant metal portion 104. The coupling capacitance 104c may be substantial (as depicted by the thick-lined, large capacitor-like structure between the active metal portion 116 and the redundant metal portion 104) and may be a parasitic coupling capacitance. Other large parasitic coupling capacitances may occur between other pairs of neighboring active and redundant metal portions, such as (but not limited to) large parasitic coupling capacitances 106c, 108c, and 110c.

Such parasitic coupling capacitances may have a significant deleterious impact on signal timing, maximum frequency range for logic paths, and overall performance achievable for the IC design. The methods described herein may utilize modifications to the layout data file and associated mask information (e.g., the mask information 101 of FIG. 1A) to modify metal portions (e.g., redundant metal portions) of the layout data file and the resulting corresponding metal portions of a process layer (e.g., the process layer 102) so as to reduce the parasitic coupling capacitances and their deleterious impact on signal timing, signal frequency range, and design performance. It is to be understood that FIG. 1B, the process layer 102 and its components are presented herein to allow description of the generated process layer 102 itself and also to allow description of the data representations that correspond to the generated process layer 102. Such data representations may be part of the layout information and/or mask information 101 of FIG. 1A.

Figure 2A:
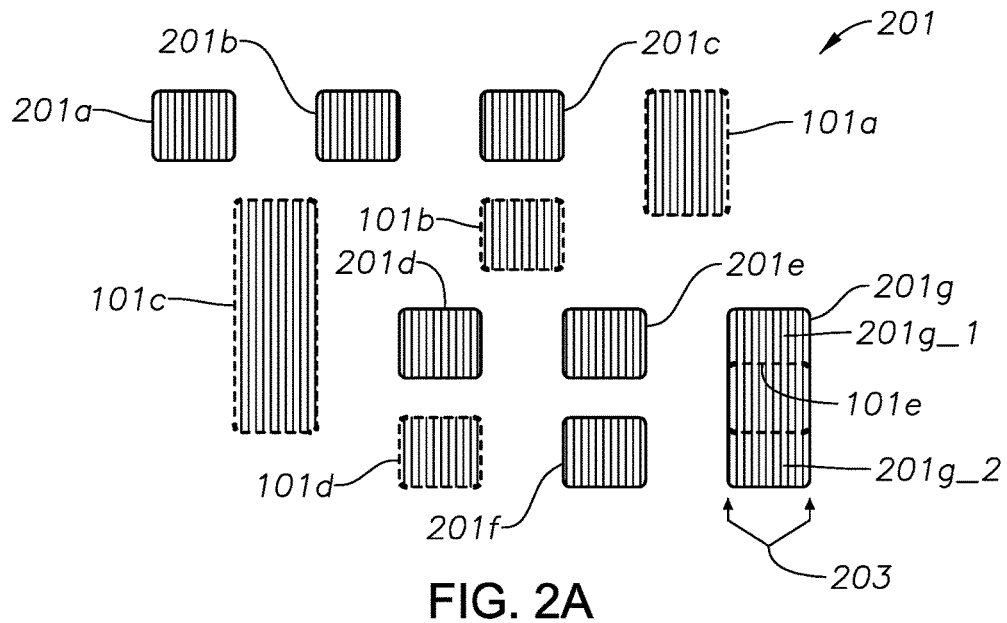
FIG. 2A illustrates exemplary modified mask information associated with a method in accordance with one embodiment.

Referring to FIG. 2A, exemplary modified mask information associated with a method in accordance with one embodiment is shown and generally designated 201. The modified mask information 201 may be included in the layout data file that has layout information and which is associated with a SAMP process (e.g., a line-cut SAMP approach), as described with reference to FIGS. 1A and 1B. The layout data file may include layout information associated with an integrated circuit design of a process technology. In a particular embodiment, the layout information may further include other mask information, information corresponding to one or more active metal portions, or a combination of both. In another embodiment, the modified mask information 201 may be part of a separate data file that is based on the layout data file.

The modified mask information 201 may include the one or more trim features that collectively represent a first set of trim features. For example, the modified mask information 201 may include the trim features 101a-101e of FIG. 1A that are part of the first set of trim features (e.g., the dashed outlined polygons illustrated in vertical stripes). The modified mask information 201 may also include one or more other trim features that collectively represent a second set of trim features. For example, the modified mask information 201 may include the trim features 201a-201g that are part of the second set of trim features (e.g., the polygons illustrated in vertical stripes without dashed outlines). Any number of trim features may be part of either the first or second sets of trim features. The trim feature 201g may be comprised of trim features 201g_1, 201g_2 and 101e. The first set of trim features (e.g., trim features 101a-101e) and the second set of trim features (e.g., trim features 201a-201g) may collectively form a trim pattern of the modified mask information 201.

The first set and second set of trim features may be associated with a trim mask (e.g., a first trim mask) that is generated based on the modified mask information 201. The area of each of the trim features 101a-101e may correspond to areas of an inter-layer dielectric (ILD) layer that are absent of metal after a metal fill process. For example, the trim features 101a-101e as part of the mask information 101 may be used to form a corresponding trim mask having shapes substantially similar to the trim features 101a-101e and 201a-201g. The corresponding trim mask, as part of a line-cut SAMP process and/or fabrication process, may be used to determine the metal patterns to be filled with metal during a metal fill process associated with the SAMP (e.g., a metal fill step and/or CMP). Accordingly, the trim features 101a-101e and 201a-201g may define in part the metal lines (e.g., active metal and redundant metal) and their associated line "ends" that are formed in an ILD after the metal fill/CMP processes.

The second set of trim features (e.g., the one or more other trim features, such as 201a-201g) of the modified mask information 201 may be associated with the perforation of one or more redundant metal portions of the layout data file. For example, the layout data file may have data representations of redundant metal portions (e.g., portions 104,106, and 110 of FIG. 1B) that may be defined in part by the first set of trim features (e.g., trim features 101a-101e). The second set of trim features (e.g., the trim features 201a-201g) may enable the perforation of one or more redundant metal portions (such as portions 104, 106, and 110 of FIG. 1A) to enable the formation of redundant metal sub-portions that may each have a size that is smaller than a size of a corresponding redundant metal portion of the one or more redundant metal portions. The redundant metal sub-portions may be defined in part by the second set of trim features (e.g., 201a-201g) that are part of the modified mask information 201 of the layout data file. In this manner, the perforation of one or more redundant metal portions and the corresponding formation of redundant metal sub-portions may reduce the large parasitic coupling capacitance (e.g., coupling capacitance 104c of FIG. 1B) associated with the redundant metal portions (e.g., redundant metal portion 104 of FIG. 1B) into smaller parasitic coupling capacitances. As such, the methods described herein for modifying metal portions and mask information of the layout data file may reduce the parasitic coupling capacitances associated with redundant metal portions and their deleterious impact on signal timing, signal frequency, and design performance.

In a particular embodiment, perforation of redundant metal portions may substantially eliminate one or more parasitic coupling capacitances associated with the one or more active metal portions and the redundant metal portions. For example, the second set of trim features may include trim features whose orientation and spacing between trim features is minimized to enable the trim features to be arranged closer together while not violating minimum spacing rules associated with the SAMP process, the process technology, or other design rules. The orientation and spacing of trim features of the first and second sets of trim features may be part of arrangement information that is included in the modified mask information 201. Varying the spacing between trim features so as to result in closely spaced trim features of the modified mask information 201 may enable the perforation of redundant metal portions. Such perforation may enable the corresponding formation of one or more redundant metal sub-portions that have a size that is smaller than a minimum metal fill size associated with one or more metal fill steps of a lithographic process. In this case, the resulting redundant metal sub-portions may be of a size too small to be metal filled by a metal fill process. Accordingly, such resulting redundant metal sub-portions may not contain metal and may be substantially lacking of associated parasitic coupling capacitance. In this manner, the spacing and arrangement of trim features for perforating redundant metal portions associated with the methods described herein may substantially eliminate the one or more parasitic coupling capacitances associated with the one or more active metal and redundant metal portions. This substantial elimination of parasitic coupling capacitance may enable a corresponding improvement in signal timing, signal frequency range, and design performance for the IC design.

In another embodiment, the spacing and arrangement of trim features for perforating redundant metal portions may reduce the use of multiple masks for achieving a desired trim pattern. For example, a desired trim pattern may include trim features for perforation that are too close together (e.g., trim features susceptible to a "merging" effect) such that the features may not form (e.g., "print") properly as a single trim mask which may then necessitate the use of multiple masks (e.g., sub-masks of a trim mask). Varying the arrangement and spacing between trim features associated with the methods described herein may enable closer trim features to be part of the formation and printing of a single mask while substantially achieving the desired trim pattern that is associated with use of multiple masks. Additionally, in the event that adjacent trim features associated with perforation may merge together, such merging may pose few detrimental effects as the metal between the adjacent trim features is merely redundant metal. In this way, such merging may beneficially result in the removal of more redundant metal during perforation.

In a particular embodiment, the modified mask information 201 having first and second sets of trim features (101a-101e and 201a-201g, respectively) may enable an improvement in mask yield associated with the corresponding trim mask formed as part of the line-cut SAMP process. In a non-limiting example, one or more of the trim features (e.g., 201g_1 and 201g_2) of the second set of trim features may be selectively aligned with one or more of the trim features (e.g., 101e) of the first set of trim features. Such alignments may be represented in the arrangement information associated with the first set of trim features and the second set of trim features. The arrangement information may be included in the modified mask information 201.

To illustrate, one or both of the trim features 201g_1 and 201g_2 of the second set of trim features may be selectively aligned with the trim feature 101e of the first set of trim features. Trim features 201g_1 and 201g_2 may be aligned with the edges (as indicated by the arrows 203) of the trim feature 101e. Alignment of the trim features 201g_1, 201g_2 with trim feature 101e may form the trim feature 201g having a shape and size that enables better formation (e.g., "printing") within a corresponding trim mask and a corresponding improvement in mask yield associated with the corresponding trim mask. In this manner, selective alignment of one or more trim features of the first set of trim features with one or more trim features of the second set (or other sets) of trim features may enable an increase in mask yield associated with the corresponding trim mask formed as part of the line-cut SAMP process. In a non-limiting embodiment, the selective alignment of trim features provided by the modified mask information and the methods described herein may be associated with a "selective etch" process that utilizes the various trim features described herein. For example, the incorporation of the "selective etch" process may enable the merging of neighboring trim features across unselected sets (e.g., sets of materials, sets of metal lines, etc.) to result in larger and/or less complex trim features with improved alignments for improved mask yield. In a particular embodiment, the selective alignment of trim features may be based on a comparison of potential trim mask yield versus a potential reduction in parasitic coupling capacitance associated with metal portions of the layout data file, as further described herein with reference to FIG. 3.

Figure 2B:
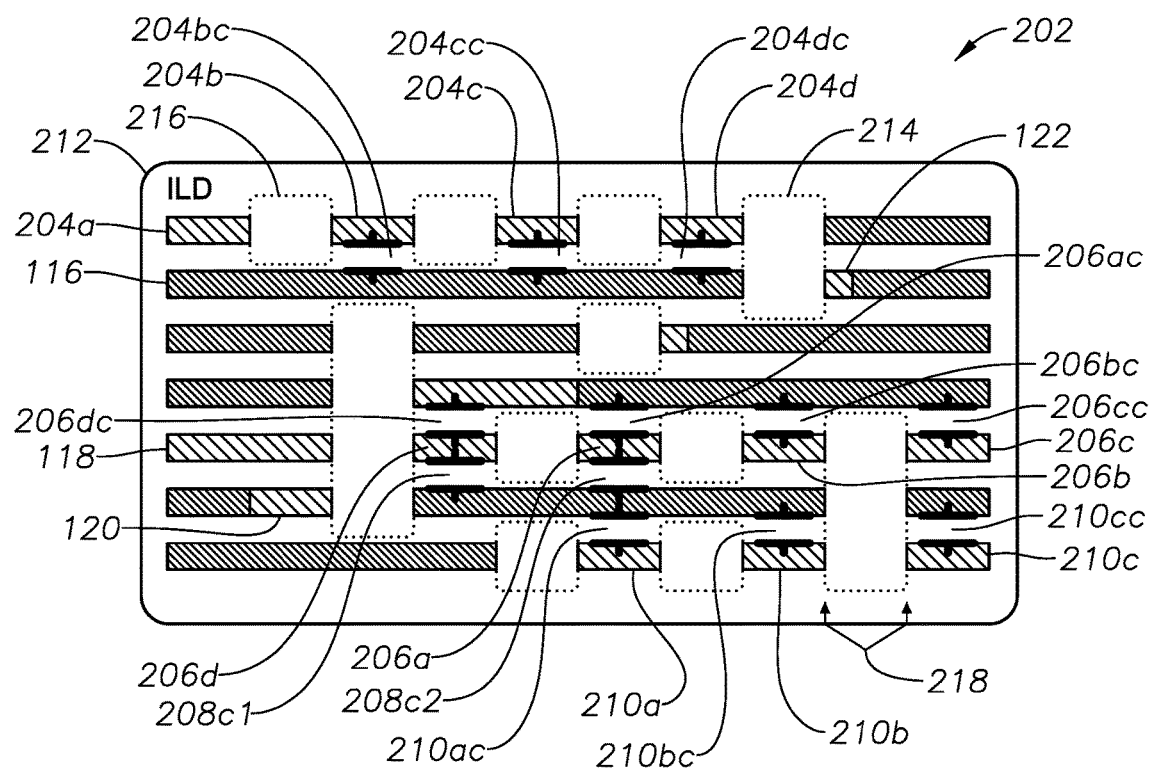
FIG. 2B is a diagram that illustrates another exemplary process layer with portions of metal lines generated in the layer using a SAMP process that is associated with a method in accordance with one embodiment.

Referring to FIG. 2B, an exemplary process layer with portions of metal lines generated in the layer using a SAMP process that is associated with a method in accordance with one embodiment is shown and generally designated 202. The process layer 202 may be based on the modified mask information 201 of FIG. 2A and its associated layout data file. For example, the layout data file, having the modified mask information 201 (as well as other information), may be utilized as part of the SAMP process (e.g., a line-cut SAMP approach) to generate metal line portions (and their sub-portions), such as active metal portions and redundant metal portions, within the process layer 202. Accordingly, the metal line portions (and their associated characteristics: dimensions, electrical parameters, capacitances, layer and/or circuit information) of the process layer 202 may have corresponding data representations that are part of the layout information and/or modified mask information 201 of FIG. 2A.

The process layer 202 may be an inter-layer dielectric (ILD) 212 of a process technology. The process layer 202 may include various portions (and sub-portions) of metal lines that may be within the ILD 212. For example, the process layer 202 may include one or more active metal portions (e.g., as indicated by the dark compressed diagonal-stripe pattern) as exemplified by, but not limited to, the active metal portion 116. The process layer 202 may also include one or more redundant metal portions and one or more redundant metal sub-portions (e.g., as indicated by the light uncompressed diagonal-stripe pattern) as exemplified by, but not limited to, the redundant metal portion 118 and the redundant metal sub-portions 204a-204d, 206a-206d, and 210a-210c. The physical, electrical, and extension characteristics of the active metal portions, redundant metal portions and sub-portions may be similar to those described with reference to FIG. 1B.

The active metal portions, the redundant metal portions, and the redundant metal sub-portions may be based on the modified mask information 201 of FIG. 2A and its associated layout data file. For example, certain areas on the process layer 202 that do not have metal portions (for example as depicted by the dotted outlined areas) may correspond to the trim features 101a-101e and 201a-201g of the modified mask information 201 of FIG. 2A. To illustrate, the dotted outlined area 214 may correspond to the trim feature 101a of FIG. 2A and the dotted outlined area 216 may correspond to the trim feature 201a of FIG. 2A. Trim features 101b-101e and 201b-201g of the modified mask information 201 of FIG. 2A may similarly correspond to the other dotted outlined areas depicted in FIG. 2B. It is to be understood that the dotted outlined areas of FIG. 2B indicate un-metalized areas that are the result of trim features of the mask information 201. In this manner, the patterning of metal portions and their associated line ends are defined in part by the information (e.g., the trim features, mask information, layout information, etc.) of the layout data file.

The redundant metal sub-portions 204a-204d, 206a-206d, and 210a-210c may be the result of the perforation of corresponding redundant metal portions (e.g., portions 104, 106, and 110 of FIG. 1B defined in part by the first set of trim features 101a-101e). The perforations of redundant metal portions may be enabled by a second set of trim features (e.g., trim features 101a-101e and 201a-201g of FIG. 2A) that are part of mask information (e.g., mask information 201 of FIG. 2A) of a layout data file. Such perforations may enable the redundant metal sub-portions to each have a size that is smaller than a size of a corresponding redundant metal portion. For example, the redundant metal portion 104 of FIG. 1B may have a size that corresponds to an associated large parasitic coupling capacitance 104c of FIG. 1B. The trim features 201a-201c of FIG. 2A may enable the perforation of the redundant metal portion 104 of FIG. 1B and enable the formation of corresponding redundant metal sub-portions 204a-204d within the process layer 202. Each of the redundant metal sub-portions 204a-204d may have a size that is smaller than the size of the corresponding redundant metal portion 104.

In a similar manner, the trim features 201d-201g of FIG. 2A may enable the perforation of the redundant metal portions 106 and 110 of FIG. 1B and enable the formation of corresponding redundant metal sub-portions 206a-206d and 210a-210c within the process layer 202. Each of the redundant metal sub-portions 206a-206d may have a size that is smaller than the size of the corresponding redundant metal portion 106 of FIG. 1B. Additionally, each of the redundant metal sub-portions 210a-210c may have a size that is smaller than the size of the corresponding redundant metal portion 110 of FIG. 1B.

Accordingly, parasitic coupling capacitances 204bc-204dc associated with redundant metal sub-portions 204b-204d respectively, may each have a capacitance that is smaller (as depicted by the thick-lined, small capacitor-like structures between the active metal portion 116 and the redundant metal sub-portions 204b-204d) than the large parasitic coupling capacitance 104c of FIG. 1B that is associated with the redundant metal portion 104 of FIG. 1B. In a similar manner, the parasitic coupling capacitances 206ac-206dc and 208c1-208c2 associated with redundant metal sub-portions 206a-206d, and the parasitic coupling capacitances 210ac-210cc associated with redundant metal sub-portions 210a-210c, may each have a capacitance that is smaller than the corresponding large parasitic coupling capacitances 106c, 108c, and 110c of FIG. 1B associated with the redundant metal portions 106 and 110 of FIG. 1B, respectively. In this manner, the perforation of one or more redundant metal portions and the corresponding formation of redundant metal sub-portions within the process layer 202 may reduce parasitic coupling capacitances associated with the redundant metal portions.

Such perforation of redundant metal portions and resulting reduction in parasitic coupling capacitances may significantly reduce the deleterious impact on the timing of signal timing, maximum frequency range, and overall performance achievable for the logic paths of the IC design. The methods described herein may utilize modifications to the layout data file and associated mask information (e.g., the modified mask information 201 of FIG. 2A) to perforate metal portions (e.g., redundant metal portions) of the layout data file and the corresponding the metal portions of the process layer (e.g., the process layer 202) formed by the SAMP and metal fill processes.

In a particular embodiment, the process layer 202 may include redundant metal sub-portions that are based on trim features of a second set of trim features that have been selectively aligned with trim features of a first set of trim features. In another embodiment, the process layer 202 may include redundant metal sub-portions that are based on trim features of a second set of trim features that have been selectively aligned with line ends of metals portions. For example, the redundant metal sub-portions 206b, 206c, 210b, and 210c may be based on trim features (e.g., 201g_1 and 201g_2 of FIG. 2A) that have been selectively aligned with line ends (as indicated by the arrows of 218) of neighboring active metal portions. Such alignments may be represented in the arrangement information that may be included in the modified mask information 201. In another embodiment, such alignments may be associated with a "selective etch" process that utilizes the various trim features described herein.

It is to be understood that FIG. 2B, the process layer 202 and its components are presented herein to allow description of the generated process layer 202 itself and also to allow description of the data representations that correspond to the generated process layer 202. Such data representations may be part of the layout information and/or mask information 201 of FIG. 2A.

Figure 3:
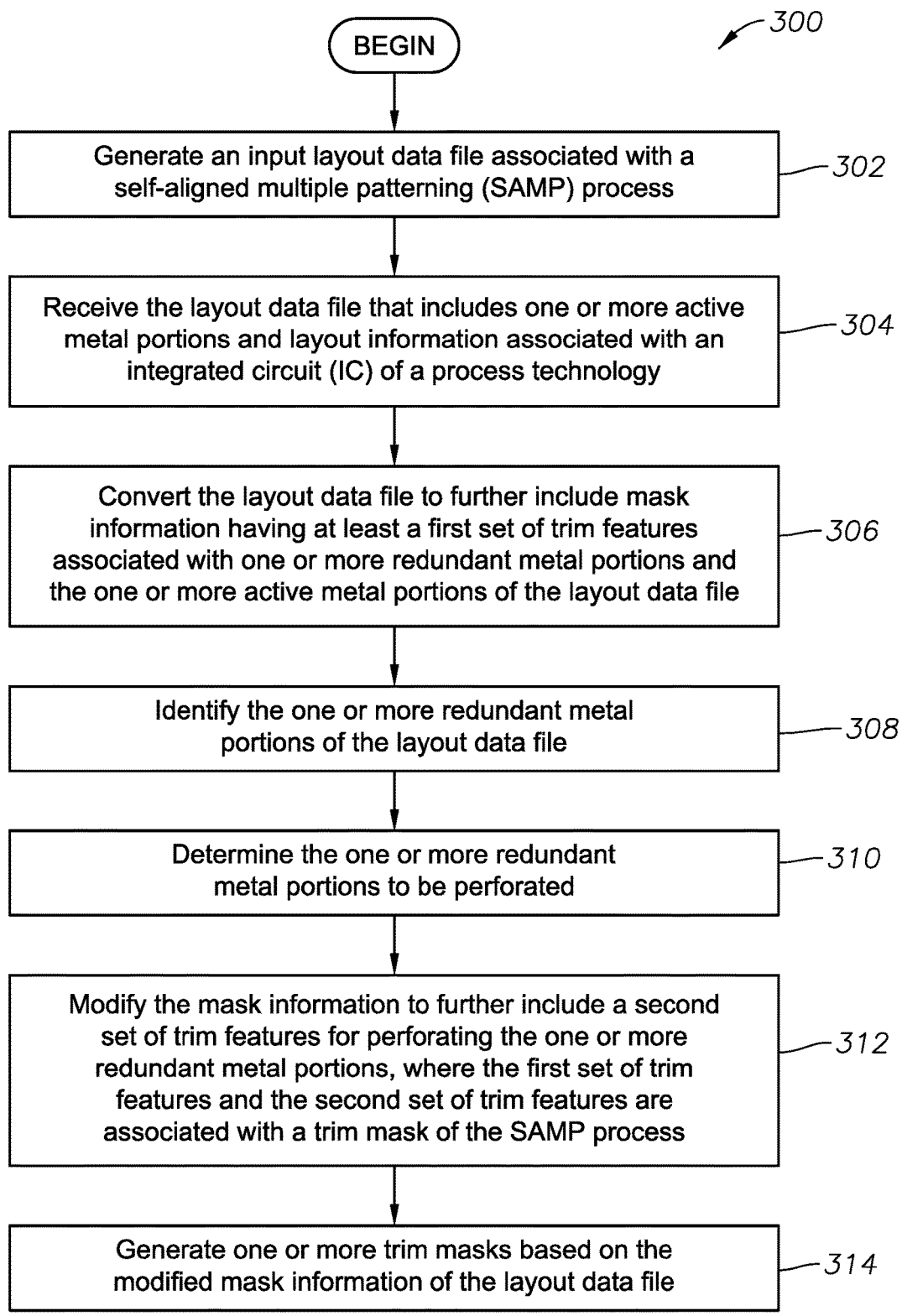
FIG. 3 is a flow chart that illustrates a particular embodiment of a method of modifying metal portions of a layout data file associated with a SAMP process.

Referring to FIG. 3, a particular embodiment of a method of modifying metal portions of a layout data file associated with a self-aligned multiple patterning (SAMP) process is shown and generally designated 300. The method 300 may include generating an input layout data file associated with a SAMP process at 302 (e.g., a line-cut SAMP approach). For example, IC design information (e.g., information related to schematic, layout, place+route, functional definitions, design rules, process rules, etc.) may be used to form (and/or may be a part of) an input layout data file. The layout data file may include one or more active metal portions and other layout information associated with the IC of a process technology. In a particular embodiment, the input layout data file may be generated by one or more modules of a system associated with the method 300 as described herein.

In a particular embodiment, the layout data file may be lithographically aware by the inclusion of initial mask information (e.g., mask optimization rules, verification information, trim mask parameters, etc.) and/or the addition of metal portion extensions (e.g., redundant metal extensions) to metal line portions of the layout data file. For example, the layout data file may be modified to include one or more redundant metal extensions that are associated with the one or more active metal portions. Addition of the one or more redundant metal extensions may provide improved alignment of one or more trim features to enable a reduction in the complexity of the trim feature shapes. For example, the added extensions may result in the removing of "jogs" within the trim feature shape or may result in more trim features of a particular shape (e.g. rectangular) or of a particular size (e.g., longer or wider rectangles). Such results may further reduce trim feature complexity and enable an improvement in trim mask yields.

The addition of metal portion extensions may correspond to boundaries of one or more trim features of a trim mask. The addition of metal portion extensions may be part of a trim feature optimization process for the improvement of trim mask yield associated with the SAMP process. The extensions may be added to the layout data file based on one or more trim mask parameters, one or more trim mask optimization rules, or both. The one or more trim mask parameters and one or more trim mask optimization rules may be associated with a trim mask and may be part of the initial mask information of the layout data file. The trim mask parameters may include parameters that enable the reduction of trim feature complexity for improved trim mask yield. For example, the trim mask parameters may include, but are not limited to, a trim feature minimum size, a trim feature minimum width, a spacing between two trim features, or any combination thereof. In another embodiment, the trim mask parameters may include a parameter that is based on lithography simulations, such as simulations that are part of a process variation (PV) band contour optimization process. In a particular embodiment, the trim mask parameters may include a parameter that is based on a mask complexity optimization process. For example, as part of the mask complexity optimization process, one or more sub-processes or their combinations may be executed. These sub-processes may include optical proximity correction (OPC), sub-resolution assist feature (SRAF) generation, and other mask generation sub-processes. An assessment of the executed sub-processes may be performed and a trim mask parameter may be determined based on the assessment. The assessment may include a determination of polygon count, vertex count, total line edge (TLE) count, or any combination thereof.

The addition of the one or more redundant metal extensions represents a particular example of how the input layout data file may be modified to accommodate and made aware of lithographic constraints associated with the SAMP process and/or the process technology. In another embodiment, the layout data file may be unaware of certain lithographic constraints. In such a case, the method 300 may include other steps in which the layout data file may be further processed to optimize and verify layout information, the initial mask information (e.g., mandrel shapes, sub-mandrel shapes, trim features, etc.), or both.

The method 300 also includes receiving the layout data file that includes one or more active metal portions and layout information associated with the IC of the process technology at 304. For example, the generated input layout data file that includes layout information, design information, and initial mask information may be received as part of the modifying of metal portions associated with the SMP process.

The method 300 also includes converting the layout data file to further include additional mask information having at least a first set of trim features associated with one or more redundant metal portions and the one or more active metal portions of the layout data file at 306. For example, the received input layout data file having layout information, design information, and initial mask information may be processed in a manner that enables the additional mask information that may also include the initial mask information. The mask information (e.g., the initial mask information and additional mask information) may include at least a first set of trim features (e.g., the trim features 101a-101e of FIG. 1A or 2A). The first set of trim features may be associated with one or more redundant metal portions (e.g., the redundant metal portions of FIG. 1B, 2B, or 4B, such as the redundant metal portions 104, 106, 110 and 118) of the layout data file, may also be associated with one or more active metal portions (e.g., the active metal portions of FIG. 1B, 2B, or 4B, such as active metal portion 116) of the layout data file, or be associated with both.

To illustrate a particular embodiment, converting the received input layout data file may include one or more decomposition steps associated with the SAMP process. The one or more decomposition steps may include the conversion of design "nets" and/or connectivity information (e.g., connectivity nodes) into shape information associated with masks (e.g., mandrel mask, sub-mandrel mask, and/or trim mask) of the SAMP process. In one embodiment, the additional mask information may be part of the conversion (e.g., part of the one or more decomposition steps) of the layout data file. In another embodiment, the additional mask information may occur prior to conversion of the layout data file.

The conversion process may enable the formation of a layout data that includes layout information, design information, mask information (e.g., initial and additional mask information), conversion information (e.g., decomposition information), the one or more active metal portions, metal portion extensions, the one or more redundant metal portions, and other layout information associated with the IC design. Such a layout data file may be further processed utilizing the steps of the method 300.

The method 300 also includes identifying the one or more redundant metal portions of the layout data file at 308. For example, data of the layout data file may be processed in order to identify one or more redundant metal portions (e.g., the redundant metal portions of FIG. 1B, 2B, or 4B, such as the redundant metal portions 104, 106, 110 and 118). Identifying the one or more redundant metal portions may be based on information associated with the one or more redundant metal portions (e.g., redundant metal information). Such redundant metal information may include identifier information, layer information, connection information, or any combination thereof. The redundant metal information may be sourced from the layout data file, from other design data files, from process technology data files, or from any combination thereof. In a particular embodiment, identifying the one or more redundant metal portions may include applying one or more logic operations to the identifier information, the layer information, the connection information, or any combination thereof. For example, one or more Boolean style operations/commands may be performed on the data of the layout data file to facilitate identification of the one or more redundant metal portions. The identification of the one or more redundant metal portions may be used to facilitate determination of redundant metal portions to be perforated. In another embodiment, identifying the one or more redundant metal portions may occur by utilizing place and route information along with other logical information (e.g., register transfer level [RTL] or other functional definitions of the design). In this manner, "net" connectivity may be determined and associated redundant metal portions may be further identified.

The method 300 also includes determining the one or more redundant metal portions to be perforated at 310. For example, each of the one or more redundant metal portions that have been identified (e.g., the redundant metal portions 104, 106, 110 and 118 of FIG. 1B, 2B, or 4B) may be processed to determine if each redundant metal portion is to be perforated by the use of trim features (e.g., the second set of trim features 201*a*-201*g* of FIG. 2B) included in mask information (e.g., the modified mask information 201 of FIG. 2A) of the layout data file. In a particular embodiment, the determination step 310 may include identifying the one or more redundant metal portions of the layout data file as described with respect to step 308. The determination may be based on one or more parameters of the mask information. In a non-limiting example, the determination may be based on whether a size of each of the one or more redundant metal portions is greater than a mask parameter value associated with a SAMP process. The mask parameter value may be determined based on a trim feature minimum width (i.e., a trim mask parameter), a trim feature minimum space, or a combination of both. In a particular embodiment, the determination may be based on whether a size of each of the one or more redundant metal portions is greater than or equal to a value for a trim feature minimum width plus a value for two minimum trim feature spacings. Those identified redundant metal portions that have a size greater than the mask parameter value may be selected to undergo perforation. In a particular embodiment, the number of perforations associated with a selected redundant metal portion may be based on the size of the selected redundant metal portion. For example, based on the size of the selected portion as many perforations as possible may be made without violating one or more design rules, process technology rules (e.g., mask rules, layout rules, lithography rules), or both.

In another embodiment, the determination may be based on a comparison of potential trim mask yield versus a potential reduction in parasitic coupling capacitance. For example, perforations resulting from the use of a proposed set of trim features may be assessed on the amount/degree of reduced coupling capacitance versus the amount/degree of the potential trim mask yield provided by the perforations made to the one or more identified redundant metal portions. A comparison between the resulting reduced coupling capacitance and resulting trim mask yield may take into account cost parameters, design parameters, and/or design specifications as part of the determination of which identified redundant metal portions are to be perforated and their degree of perforation.

The method 300 also includes modifying the mask information of the layout data file to further include a second set of trim features for perforating the one or more redundant metal portions, where the first set of trim features and the second set of trim features are associated with a trim mask of the SAMP process at 312. Perforating the one or more redundant metal portions may reduce one or more coupling capacitances associated with one or more active metal portions and the one or more redundant metal portions. The layout data file (e.g., the layout data file of the steps 302-310) may have mask information (e.g., the mask information 101 of FIG. 1A) that may be modified with a second set of trim features (e.g., the trim features 201*a*-201*g* of FIG. 2A) to form modified mask information (e.g., the modified mask information 201 or 401 of FIG. 2A or 4A, respectively). Modification of the mask information may be based on the determination of the redundant metal portions to be perforated. The mask information may have a first set of trim features (e.g., trim features 101*a*-101*e* of FIG. 1A or 2A). The second set of trim features enable the perforation of the one or more redundant metal portions (such as portions 104, 106, and 110 of FIG. 1A) and the generation of one or more redundant metal sub-portions (e.g., the redundant metal sub-portions 204*a*-204*d*, 206*a*-206*d*, and 210*a*-210*c* of FIG. 2B). The first set of trim features and the second set of trim features may be associated with a trim mask of the SAMP process.

The resulting one or more redundant metal sub-portions may each have a size that is smaller than a size of the corresponding redundant metal portion of the one or more redundant metal portions. Each of the resulting one or more redundant metal sub-portions may be associated with a corresponding parasitic coupling capacitance (e.g., the capacitances 206ac-206dc, 208c1-208c2, and 210ac-210cc of FIG. 2B) that is less than the corresponding large parasitic coupling capacitances (e.g., the capacitances 106c, 108c, and 110c of FIG. 1B) associated with the one or more redundant metal portions. In this manner, modification of the mask information of the layout data file may reduce or substantially eliminate the parasitic coupling capacitances associated with redundant metal portions and their deleterious impact on signal timing, signal frequency range, and design performance.

In a particular embodiment, varying the spacing between trim features of the second set of trim features may provide for closely spaced trim features of the modified mask information (e.g., mask information 201 of FIG. 2A) and corresponding closely spaced perforations of redundant metal portions. Such closely spaced perforations may enable the corresponding formation of one or more redundant metal sub-portions that have a size that is smaller than a minimum metal fill size associated with one or more metal fill steps of a manufacturing process. In such a case, redundant metal sub-portions may be of a size too small to be metal filled and may be substantially lacking of associated parasitic coupling capacitance. Accordingly, one or more coupling capacitances associated with the one or more redundant metal sub-portions and the one or more active metal portions may be substantially eliminated based on a size of the one or more redundant metal sub-portions.

In a particular embodiment, the modification of the mask information of the layout data file may also enable the selective alignment of one or more trim features of the first set of trim features with one or more trim features of the second set (or other sets) of trim features which may enable an increase in mask yield associated with the corresponding trim mask formed as part of the line-cut SAMP process. For example, the mask information may include arrangement information associated with the first set of trim features and the second set of trim features. Such arrangement information may enable the indication that one or more trim features of the second set of trim features are aligned with one or more trim features of the first set of trim features. Such selective alignment amongst trim features may be in a manner similar to the alignments described with reference to FIGS. 2A and/or 2B.

In another embodiment, the modification step 312 may further include modifying the mask information (e.g., the mask information 101 of FIG. 1A) of the layout data file with a third set of trim features (e.g., the trim features 401a-401c of FIG. 4A) that is associated with reducing the size of the one or more redundant metal portions. In a particular embodiment, the third set of trim features may have an orientation that is orthogonal to orientations of either the first set of trim features or the second set of trim features, or both. The third set of trim features may enable the reduction or elimination of the one or more redundant metal portions defined in part by a first set of trim features (e.g., trim features 101a-101e of FIG. 1A or 2A) and corresponding first trim mask.

The method 300 may further include generating one or more trim masks based on the modified mask information of the layout data file at 314. For example, the layout data file (e.g., the layout data file of the step 312) may have modified mask information (e.g., the modified mask information 201 of FIG. 2A or 401 of FIG. 4A) that may be used to generate one or more trim masks associated with the SAMP process.

In a particular embodiment, the method 300 may be performed with the addition of other processing steps or without certain steps described herein. For example, the method 300 may be performed without the step 314. To illustrate, steps 302-312 of the method 300 may be performed separately from step 314, such that the generation of trim masks utilizing the modified mask information of the layout data file may occur at a later time and/or by a module(s) not directly associated with the method 300. Whilst steps 302-314 of the method 300 are shown as being performed sequentially, it will be appreciated that two or more of these steps could be performed in a different order or in parallel.

The method 300 may address mask yield and performance limitations associated with the metal portions of a line-cut SAMP process. For example, the method 300 may provide the enablement of reduced parasitic capacitances associated with metal portions formed with a line-cut SAMP process and may provide reductions in the magnitude of EPE and the probability of misalignment associated with trim features of the trim mask. Such provisions of the method 300 may enable corresponding improvements in signal timing and achievable maximum frequency for the IC design, as well as corresponding improvements to mask yield for trim masks of the SAMP process.

Figure 4A:
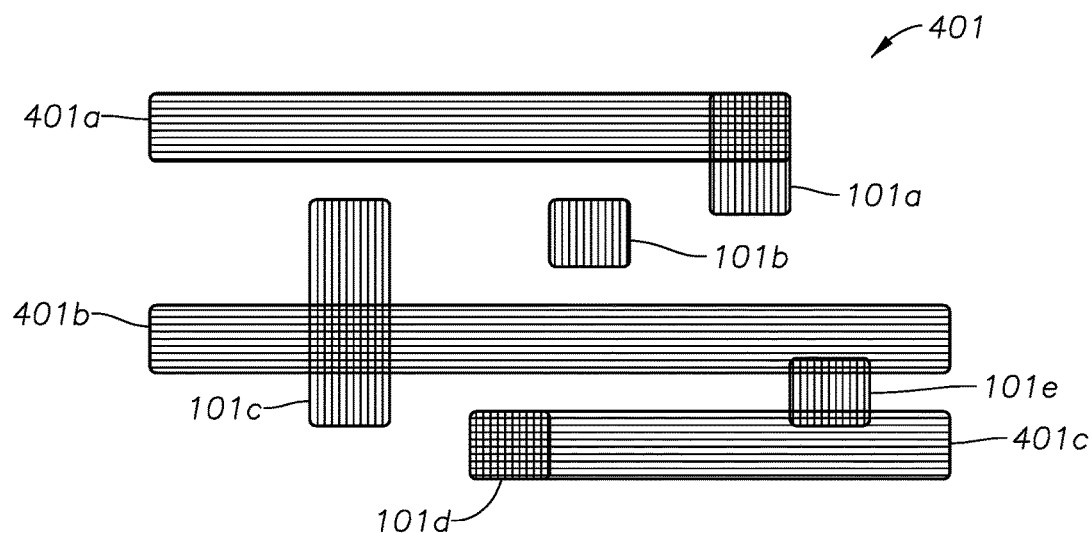
FIG. 4A illustrates another exemplary modified mask information associated with a method in accordance with one embodiment.

Referring to FIG. 4A, another exemplary modified mask information associated with a method in accordance with one embodiment is shown and generally designated 401. The modified mask information 401 may be included in the layout data file that has layout information and which is associated with a SAMP process (e.g., a line-cut SAMP approach), as described with reference to FIGS. 1A and 1B. The layout data file may include layout information associated with an IC design of a process technology. In a particular embodiment, the layout information may further include other mask information, information corresponding to one or more active metal portions, or a combination of both. In another embodiment, the modified mask information 401 may be part of a separate data file that is based on the layout data file.

The modified mask information 401 may include the one or more trim features that collectively represent a first set of trim features. For example, the modified mask information 401 may include the trim features 101a-101e of FIG. 1A that are part of the first set of trim features (e.g., the polygons illustrated in vertical stripes). The modified mask information 401 may also include one or more other trim features that collectively represent a third set of trim features. For example, the modified mask information 401 may include the trim features 401a-401c that are part of the third set of trim features (e.g., the polygons illustrated in horizontal stripes). In a particular embodiment, the third set of trim features may have an orientation that is orthogonal to an orientation of the first set of trim features. Any number of trim features may be part of either the first or third sets of trim features. The first set trim features (e.g., trim features 101a-101e) and the third set trim features (e.g., trim features 401a-401c) may have areas that overlap (as indicated by the areas illustrated in a grid pattern). The first set of trim features and the third set of trim features may collectively form a trim pattern of the modified mask information 401. In another embodiment, the third set of trim features may be associated with a trim mask that is separate from one or more other trim masks associated with other sets of trim features (e.g., the first set and/or the second set of trim features). The separate trim mask associated with the third set of trim features may be lithographically optimized separately from the other trim masks (e.g., those masks associated with first and/or second sets of trim features) so as to enable a trade-off between improved trim mask yield for additional cost. Together, the separate and other trim masks would make up the whole trim mask for the associated metal layer, but each trim mask could be optimized separately.

The first set of trim features may be associated with a first trim mask that is generated based on the modified mask information 401. The third set trim features may be associated with a second trim mask that is generated based on the modified mask information 401. The area of each of the trim features 101a-101e and 401a-401c may correspond to areas of an inter-layer dielectric (ILD) layer that are absent of metal after a metal fill process. For example, the trim features 101a-101e and 401a-401c as part of the mask information 401 may be used to form corresponding first and second trim masks having shapes substantially similar to the trim features 101a-101e and 401a-401c. The corresponding first and second trim masks, as part of a line-cut SAMP process and/or fabrication process, may be used to determine the metal patterns to be filled with metal during a metal fill process associated with the SAMP. In a particular embodiment, the first set of trim features and second set of trim features (e.g., such as the second set of trim features of FIG. 2A) may be associated with the first trim mask that is generated based on the modified mask information 401. In this case, the third set of trim features may have an orientation that is orthogonal to orientations of both the first set of trim features and the second set of trim features.

As part of the mask information 401, the first set of trim features 101a-101e may define in part the metal portions (e.g., active metal and redundant metal) and their associated line ends that are formed within an ILD after the metal fill/CMP. The resulting first trim mask may enable the formation of the active metal portions and the redundant metal portions within a process layer (e.g., ILD layer). As part of the mask information 401, the third set of trim features 401a-401c may further define in part the metal portions and their associated line ends by reducing or eliminating one or more redundant metal portions defined in part by the first set of trim features and corresponding first trim mask. The resulting second trim mask may enable the formation of the active metal portions and may reduce or eliminate the formation of redundant metal portions within the process layer (e.g., ILD layer). The first and second trim masks may each be associated with a color representation as part of the modified mask information 401. The color representation may indicate mask identity, trim feature orientation (e.g., orthogonal, vertical, etc.), or both.

In a particular embodiment, the first trim mask may include the first set of trim features 101a-101e and may also include a second set of trim features (e.g., one or more other trim features, such as trim features 201a-201g of FIG. 2A). The second set of trim features may also be a part of the modified mask information 401 and may enable the perforation of one or more redundant metal portions of the layout data file in a manner similar to that described with reference to FIGS. 2A and 2B. Corresponding reductions or elimination of parasitic coupling capacitances, alignments and arrangements of trim features, and improvements in mask yield may be achieved with the use of the second set of trim features as part of the first trim mask of the modified mask information 401 in a manner similar to that described with reference to FIGS. 2A and 2B. In another embodiment, other sets of trim features may be a part of the modified mask information 401 that enables the formation of the first or second trim masks.

Figure 4B:
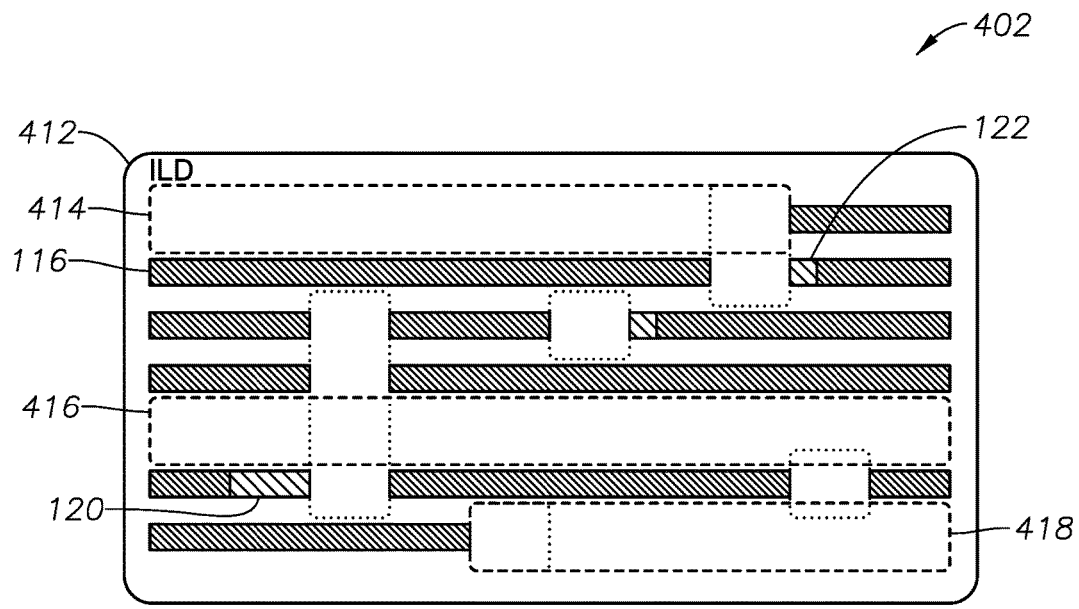
FIG. 4B is a diagram that illustrates another exemplary process layer with portions of metal lines generated in the layer using a SAMP process that is associated with a method in accordance with one embodiment.
Figure 4B:
Figure 4B:

Referring to FIG. 4B, another exemplary process layer with portions of metal lines generated in the layer using a SAMP process that is associated with a method in accordance with one embodiment is shown and generally designated 402. The process layer 402 may be based on the modified mask information 401 of FIG. 4A and its associated layout data file. For example, the layout data file, having the modified mask information 401 (as well as other information), may be utilized as part of the SAMP process (e.g., a line-cut SAMP approach) to generate metal line portions (and their sub-portions), such as active metal portions and redundant metal portions, within the process layer 402. Accordingly, the metal line portions (and their associated characteristics: dimensions, electrical parameters, capacitances, layer and/or circuit information) of the process layer 402 may have corresponding data representations that are part of the layout information and/or modified mask information 401 of FIG. 4A.

The process layer 402 may be an inter-layer dielectric (ILD) 412 of a process technology. The process layer 402 may include various portions (and sub-portions) of metal lines that may be within the ILD 412. For instance, the process layer 402 may include one or more active metal portions (e.g., as indicated by the dark compressed diagonal-stripe pattern) as exemplified by the active metal portion 116. The process layer 402 may also include one or more redundant metal portions (e.g., as indicated by the light uncompressed diagonal-stripe pattern) as exemplified by the redundant metal portion 120. In a particular embodiment, the process layer 402 may further include one or more redundant metal sub-portions (not shown). The physical, electrical, and extension characteristics of the active metal portions, redundant metal portions and redundant metal sub-portions may be similar to those described with reference to FIG. 1B.

The active metal portions, the redundant metal portions, and the redundant metal sub-portions may be based on the modified mask information 401 of FIG. 4A and its associated layout data file. For example, certain areas on the process layer 402 that do not have metal portions may correspond to either the trim features 101a-101e or the trim features 401a-401c of the modified mask information 401 of FIG. 4A. To illustrate, the dotted outlined areas may correspond to the trim feature 101a-101e of FIG. 4A and the dashed outlined areas (e.g., dashed areas 414, 416, and 418) may correspond to the trim features 401a-401c of FIG. 4A. It is to be understood that the dotted outlined areas and the dashed outlined areas of FIG. 4B indicate un-metalized areas that are the result of trim features of the mask information 401. In this manner, the patterning of metal portions and their associated line ends are defined in part by the information (e.g., the trim features, mask information, layout information, etc.) of the layout data file.

The first set of trim features 101a-101e of FIG. 4A may enable the formation of metal portions of the process layer 402 that are similar to the metal portions (e.g., active metal and redundant metal) of the process layer 102 of FIG. 1B. In comparison to the process layer 102 of FIG. 1B, the third set of trim features 401a-401c of FIG. 4A may enable the reduction or elimination of redundant metal portion formation within the process layer 402. For example, a first trim mask having the first set of trim features may enable the formation of active metal and redundant metal portions while a second trim mask having the third set of trim features which are orthogonal to the first set of trim features may enable the reduction or elimination of the redundant metal portions defined in part by the first set of trim features. To illustrate, in comparison to the process layer 102 of FIG. 1B, redundant metal portions (not shown but similar to redundant metal portions 104, 106, and 110 of FIG. 1B) in the areas outlined by the dashed areas 414, 416, and 418 have been eliminated as a result of the third set of trim features of the modified mask information 401 of FIG. 4A.

Corresponding reductions or elimination of parasitic coupling capacitances may be achieved with the use of the third set of trim features as part of the second trim mask of the modified mask information 401. In this manner, the deleterious capacitive impact on signal timing, maximum frequency range, and overall performance achievable for the IC design may be reduced and/or substantially eliminated. Other modifications to the modified mask information 401 may enable alignments/arrangements of trim features and corresponding improvements in mask yield in a manner similar to that described with reference to FIGS. 2A and 2B. It is to be understood that FIG. 4B, the process layer 402 and its components are presented herein to allow description of the generated process layer 402 itself and also to allow description of the data representations that correspond to the generated process layer 402. Such data representations may be part of the layout information and/or mask information 401 of FIG. 4A.

Figure 5:
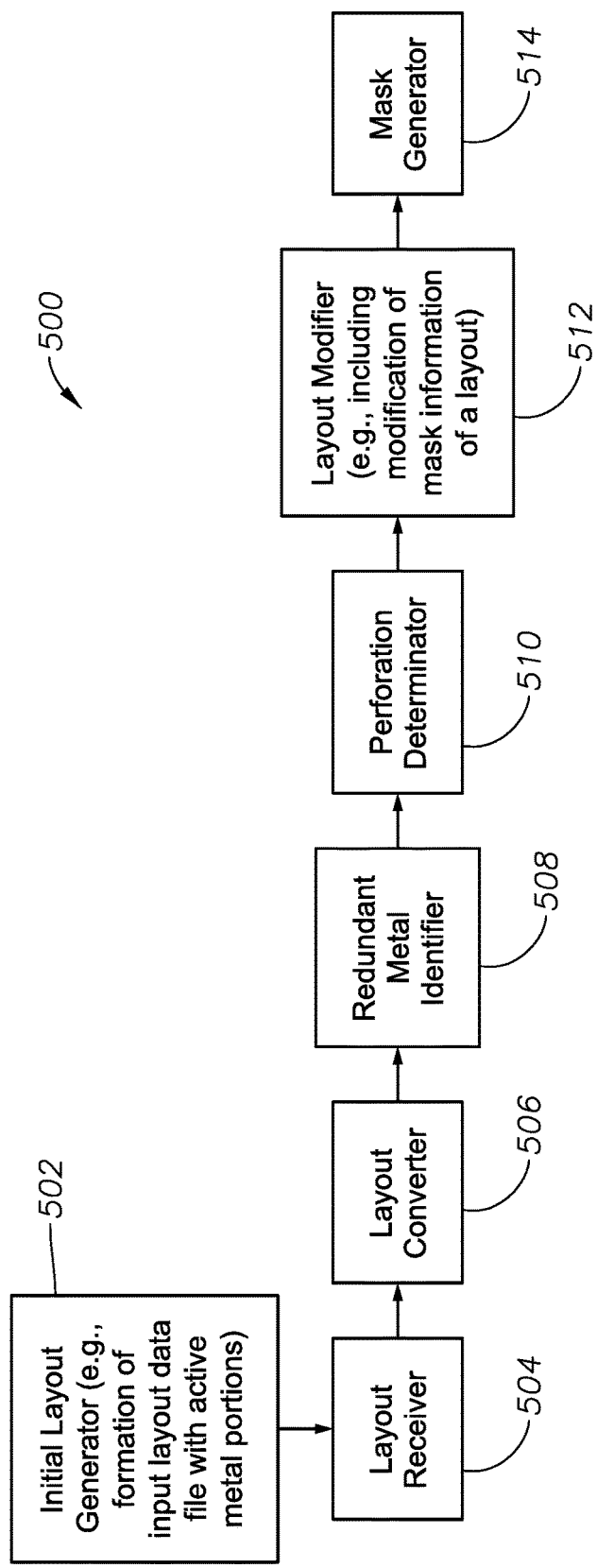
FIG. 5 is a block diagram schematically illustrating a system in accordance with one embodiment.

Referring to FIG. 5, a block diagram schematically illustrating a system in accordance with the methods, and techniques described herein is shown and generally designated 500. The system 500 may include one or more modules/components to enable modification of mask information and corresponding layout data file so as to enable at least the perforation of redundant metal portions associated with a SAMP process (e.g., a line-cut SAMP approach). The system 500 may perform the method 300 of FIG. 3 as well as the operations or techniques associated with the methods and SAMP process described herein. The system 500 may include a module such as an initial layout generator processor 502 that may enable the formation of an input layout data that includes representations of active metal portions.

The system 500 may also include other modules/components such as a layout receiver 504, a layout converter 506, a redundant metal identifier 508, a perforation determinator 510, a layout modifier 512, and a mask generator 514. In a particular embodiment, the system 500 may operate in the absence of one or more modules and/or with modules operating in a different order than described herein. For example, the system 500 may operate without the mask generator 514 and in such a case, a layout data file with modified mask information may be provided to a separate mask generator associated with a separate mask tool. The modules/components of the system 500 may be in the form of hardware modules, software modules, or a combination of both. The system 500 and its modules/components (individually or in combination) may be part of a standalone apparatus for modifying metal portions (e.g., redundant metal) associated with a SAMP process. In another embodiment, the system 500 and its modules/components (individually or in combination) may be associated with one or more electronic design automation (EDA) tools of a design process for the IC design.

The initial layout generator 502 may enable the formation of an input layout data that includes representations of active metal portions, initial mask information, design information, and other layout information. For example, the initial layout generator 502 may perform the step 302 of the method 300 of FIG. 3. In a particular embodiment, the initial layout generator 502 may be a module/component that is separate from the system 500 such that an input layout data file may be separately provided to the system 500 (e.g., provided to the layout receiver 504).

The layout receiver 504 that may receive the generated layout data file from the initial layout generator 502. For example, the layout receiver 504 may perform the step 304 of the method 300 of FIG. 3. In another embodiment, the layout receiver 504 may receive the generated layout data file from another module/component that is separate from the system 500. The received layout data file may include layout information, design information, initial mask information, and other process information. The layout data file may be received as part of the modifying of metal portions associated with the SAMP process.

The layout converter 506 may convert the generated layout data file received from the initial layout generator 502 to include mask information that has at least a first set of trim features (e.g., the trim features 101*a*-101*e* of FIG. 1A or 2A) that are associated with one or more redundant metal portions and the one or more active metal portions of the layout data file. For example, the layout converter 506 may perform the step 306 of the method 300 of FIG. 3. In a particular embodiment, the conversion performed by the layout converter 506 may include one or more decomposition steps associated with the SAMP process. The conversion performed by the layout converter 506 may modify the layout data file for further processing, as described with reference to the method 300 of FIG. 3

The redundant metal identifier 508 may process the generated layout data file converted by the layout converter 506 to identify one or more redundant metal portions (e.g., such as the redundant metal portions 104, 106, 110 and 118 of FIG. 1B, 2B, or 4B). For example, the redundant metal identifier 508 may perform the step 308 of the method 300 of FIG. 3. In a particular embodiment, the redundant metal identifier 508 may perform the step 308 of the method 300 after a conversion step associated with the method 300 (e.g., step 306 of FIG. 3). The identification of the one or more redundant metal portions may be used as part of a determination of redundant metal portions to be perforated. The redundant metal identifier 508 may perform one or more Boolean style operations/commands on the data of the layout data file to facilitate identification of the one or more redundant metal portions. The identification by the redundant metal identifier 508 may be based on information associated with the redundant metal portions, as described with reference to the method 300 of FIG. 3.

The perforation determinator 510 may utilize the layout data file processed by the layout receiver 504, the layout converter 506, and the redundant metal identifier 508 to determine the one or more redundant metal portions (e.g., the redundant metal portions 104, 106, 110 and 118 of FIG. 1B, 2B, or 4B) to be perforated. For example, the perforation determinator 510 may perform the step 310 of the method 300 of FIG. 3. In another embodiment, the determinator 510 may identify the one or more redundant metal portions of the generated layout data file in a manner similar to the redundant metal identifier 508. In another embodiment, the determination provided by the perforation determinator 510 may be based on one or more parameters of the mask information or may be based on a comparison of potential trim mask yield versus a potential reduction in parasitic coupling capacitance, as described with reference to the method 300 of FIG. 3.

The layout modifier 512 may modify the mask information (e.g., the mask information 101 FIG. 1A) to generate modified mask information (e.g., the mask information 201 or 401 of FIGS. 2A and 4A, respectively) of the layout data file. The modifications made by the layout modifier 512 may be based on the determination(s) made by the perforation determinator 510. For example, the layout modifier 512 may perform the step 312 of the method 300 of FIG. 3. The modifications made by the layout modifier 512 may include, but are not limited to, the addition of a second set of trim features (e.g., the trim features 201a-201g of FIG. 2A) to enable the perforation of the one or more redundant metal portions (such as portions 104, 106, and 110 of FIG. 1A) resulting in the formation of redundant metal sub-portions (e.g., the redundant metal sub-portions 204a-204d, 206a-206d, and 210a-210c of FIG. 2B), as described with reference to the method 300 of FIG. 3 and FIGS. 2A and 2B.

The modifications made by the layout modifier 512 may further include the modification of the mask information to enable the selective alignment of one or more trim features of a first set of trim features with one or more trim features of the second set (or other sets) of trim features. In another embodiment, the layout modifier 512 may further modify the mask information (e.g., the mask information 101 of FIG. 1A) of the layout data file with a third set of trim features (e.g., the trim features 401a-401c of FIG. 4A) that is associated with reducing the size of the one or more redundant metal portions. The modifications made by the layout modifier 512 may reduce or substantially eliminate the parasitic coupling capacitances associated with redundant metal portions and/or may enable the increase in mask yield associated with a corresponding trim mask formed as part of the line-cut SAMP process. Such modifications may improve signal timing, signal frequency, and design performance associated with metal portions of an IC associated with the line-cut SAMP process.

The mask generator 514 may utilize the layout data file that includes the modified mask information (e.g., the mask information 201 or 401 of FIGS. 2A and 4A, respectively) to generate one or more trim masks associated with the line-cut SAMP process. For example, the mask generator 514 may perform the step 314 of the method 300 of FIG. 3. In a particular embodiment, the mask generator 514 may be associated with a mask generation tool and/or module/component that is separate from the system 500.

The system 500 may provide reduced and/or substantial elimination of parasitic coupling capacitances associated with metal lines formed with a line-cut SAMP process. Furthermore, the system 500 may provide a reduction in the lithographic variability, EPE, and probability of misalignment associated with trim features of the trim mask to enable improvement of mask yield for trim masks of the SAMP process. Such provisions by the system 500 may address mask yield and performance limitations (e.g., such as signal timing and achievable maximum frequency for signals) associated with IC metal portions of a line-cut SAMP process.

Figure 6:
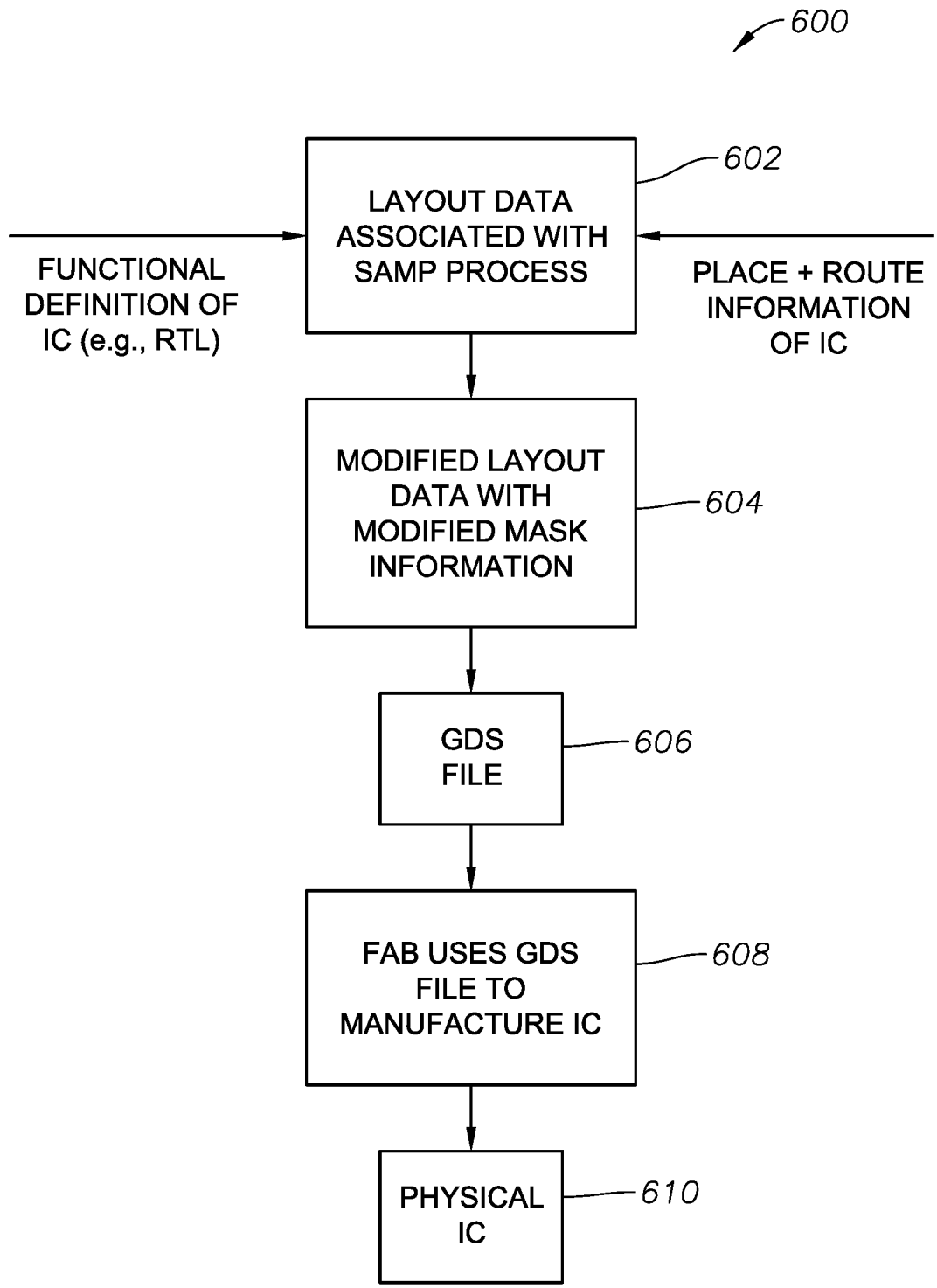
FIG. 6 schematically illustrates how an integrated circuit is manufactured in one embodiment, using modified mask information associated with the techniques described herein.

Referring to FIG. 6, a flow diagram illustrating the steps involved in one embodiment in order to manufacture a physical integrated circuit using modified mask information of a layout data file associated with a SAMP process using the earlier described methods and techniques (e.g., the method 300 of FIG. 3) is shown and generally designated 600. In particular, a layout data file associated with a SAMP process 602 (e.g., a line-cut SAMP approach) may be provided containing representative metal portions (e.g., active metal portions) and layout information that is to be modified using the above described methods and techniques. The layout data file may receive information associated with an IC design. For example, functional definitions (e.g., in the form of register transfer level [RTL]) and/or place and route information associated with an IC design may be included in the layout data file associated with a SAMP process 602. The layout data file 602 may be associated with one or more electronic design automation (EDA) tools (e.g., schematic, layout, and/or place and route tools) in which the layout data file may be processed via software modules, hardware modules or a combination of both.

For example, the layout data file associated with a SAMP process 602 may be processed for modification to generate the layout data file that includes modified layout data having modified mask information 604. A Graphic Data System (GDS) file 606 representing the information (e.g., modified layout information, modified mask information, etc.) of the layout data file 602 may be generated based on the layout data file 602. GDS is a well known file format for representing an IC layout in each of the various layers of the process technology.

At step 608, the manufacturing facility (also referred to as the fab) uses the GDS file in order to manufacture the integrated circuit, for example by depositing various layers on a semiconductor substrate in patterns defined by the GDS file. This results in the output of a physical integrated circuit having modified metal portions (e.g., perforated redundant metal portions) and corresponding reduced parasitic coupling capacitances at step 610.

Figure 7:
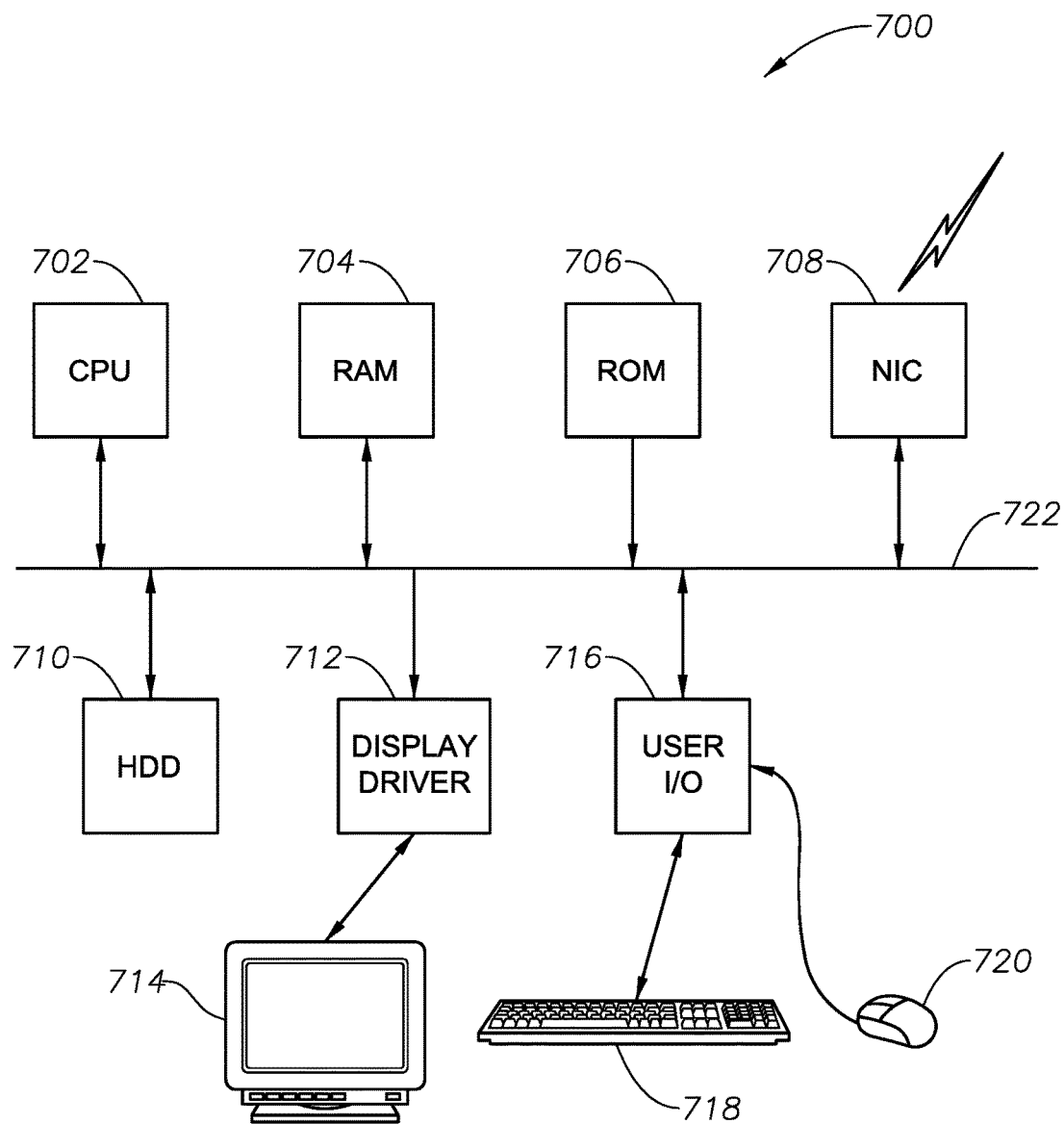
FIG. 7 schematically illustrates a general purpose computer of the type which can be used to implement the present techniques described herein.

Referring to FIG. 7, a block diagram schematically illustrating a general purpose computer of the type that may be used to implement the above described techniques is shown and generally designated 700. The general purpose computer 700 includes a central processing unit 702, a random access memory 704, a read-only memory 706, a network interface card 708, a hard disk drive 710, a display driver 712 and monitor 714, and a user input/output circuit 716 with a keyboard 718 and mouse 720 all connected via a common bus 722. In operation the central processing unit 702 will execute computer program instructions that may be stored in one or more of the random access memory 704, the read-only memory 706 and the hard disk drive 710, or dynamically downloaded via the network interface card 708. The results of the processing performed may be displayed to a user via the display driver 712 and the monitor 714. User inputs for controlling the operation of the general purpose computer 700 may be received via the user input/output circuit 716 from the keyboard 718 or the mouse 720. It will be appreciated that the computer program could be written in a variety of different computer languages. The computer program may be stored and distributed on a recording medium or dynamically downloaded to the general purpose computer 700.

When operating under control of an appropriate computer program, the general purpose computer 700 can perform the above described methods and techniques (e.g., the method 300 of FIG. 3) and can be considered to form a particular apparatus for performing the above described methods and techniques. For example, the particular apparatus may include the system 500 of FIG. 5 or one or more components/functional blocks of the system 500 of FIG. 5. As another example, the above described methods and techniques (e.g., the method 300 of FIG. 3) may be performed by the general purpose computer 700 that is controlled by a computer program product stored on a non-transitory storage medium. The architecture of the general purpose computer 700 could vary considerably, and FIG. 7 is only one example.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A method, comprising:
   receiving a layout data file that includes one or more active metal portions and layout information associated with an integrated circuit (IC) of a process technology;
   converting the layout data file to further include mask information having at least a first set of trim features associated with one or more redundant metal portions and the one or more active metal portions of the layout data file;
   determining the one or more redundant metal portions to be perforated;
   generating modified mask information by modifying the mask information to further include a second set of trim features for perforating the one or more redundant metal portions, wherein the first set of trim features and the second set of trim features are associated with a trim mask of self-aligned multiple patterning (SAMP) process;
   generating a modified layout data file incorporating the modified mask information; and
   manufacturing, or causing to be manufactured, the integrated circuit from the modified layout data file.

2. The method of claim 1, wherein perforating the one or more redundant metal portions reduces one or more coupling capacitances associated with the one or more active metal portions and the one or more redundant metal portions.

3. The method of claim 1, wherein perforating the one or more redundant metal portions generates one or more redundant metal sub-portions.

4. The method of claim 3, wherein each of the one or more redundant metal sub-portions has a size that is smaller than a size of a corresponding redundant metal portion of the one or more redundant metal portions.

5. The method of claim 3, wherein each of the one or more redundant metal sub-portions is associated with a coupling capacitance that is less than a coupling capacitance associated with a corresponding redundant metal portion of the one or more redundant metal portions.

6. The method of claim 3, wherein the one or more redundant metal sub-portions has a size that is smaller than a minimum fill size associated with a metal fill step of a manufacturing process for the process technology.

7. The method of claim 3, wherein one or more coupling capacitances associated with the one or more active metal portions are substantially eliminated based on a size of the one or more redundant metal sub-portions.

8. The method of claim 1, wherein the determination is based on whether a size of each of the one or more redundant metal portions is greater than a mask parameter value associated with the SAMP process.

9. The method of claim 1, further comprising identifying the one or more redundant metal portions based on redundant metal information that includes identifier information, layer information, connection information, or any combination thereof.

10. The method of claim 9, wherein identifying the one or more redundant metal portions includes applying one or more logic operations to the identifier information, the layer information, the connection information, or any combination thereof.

11. The method of claim 1, wherein the mask information includes arrangement information associated with the first set of trim features and the second set of trim features.

12. The method of claim 11, wherein the arrangement information indicates that one or more trim features of the second set of trim features are aligned with one or more trim features of the first set of trim features.

13. The method of claim 12, wherein the alignment of the first set of trim features with the second set of trim features enables an increase in mask yield associated with the trim mask.

14. The method of claim 1, further comprising modifying the mask information with a third set of trim features associated with reducing a size of the one or more redundant metal portions, wherein the third set of trim features have an orientation that is orthogonal to the first set of trim features and the second set of trim features.

15. The method of claim 1 further comprising modifying the layout data file to include one or more redundant metal extensions associated with the one or more active metal portions.

16. The method of claim 15, wherein inclusion of the one or more redundant metal extensions is based on one or more trim mask parameters, one or more trim mask optimization rules, or both.

17. The method of claim 16, wherein the one or more trim mask parameters include a trim feature minimum size, a trim feature minimum width, a spacing between two trim features, or any combination thereof.

18. The method of claim 1, wherein the method is being implemented by a computer program product on a non-transitory storage medium.

19. A system for manufacturing an integrated circuit, the system comprising:
   means for receiving the layout data file that includes one or more active metal portions and layout information associated with an integrated circuit (IC) of a process technology;
   means for converting the layout data file to further include mask information having at least a first set of trim features associated with one or more redundant metal portions and the one or more active metal portions of the layout data file;
   means for determining the one or more redundant metal portions to be perforated;
   means for generating modified mask information by modifying the mask information to further include a second set of trim features for perforating the one or more redundant metal portions, wherein the first set of trim features and the second set of trim features are associated with a trim mask of the SAMP process;
   means for generating a modified layout data file incorporating the modified mask information; and
   means for manufacturing, or causing to be manufactured, the integrated circuit from the modified layout data file.

20. A method of manufacturing an integrated circuit, the method comprising:

modifying metal portions associated with a self-aligned multiple patterning (SAMP) process, including:
   receiving the layout data file that includes one or more active metal portions and layout information associated with an integrated circuit (IC) of a process technology,
   converting the layout data file to further include mask information having at least a first set of trim features associated with one or more redundant metal portions and the one or more active metal portions of the layout data file,
   determining the one or more redundant metal portions to be perforated, and
   generating modified mask information by modifying the mask information to further include a second set of trim features for perforating the one or more redundant metal portions, wherein the first set of trim features and the second set of trim features are associated with a trim mask of the SAMP process;
generating a layout data file incorporating the modified mask information; and
manufacturing, or causing to be manufactured, the integrated circuit from the layout data file.

\* \* \* \* \*